United States Patent [19]

Snowdon

[11] Patent Number: 4,515,503
[45] Date of Patent: May 7, 1985

[54] METHOD AND APPARATUS FOR UNBLOCKING CONVEYING PIPES FOR PARTICULATE MATERIAL

[75] Inventor: Brian Snowdon, Doncaster, England

[73] Assignee: Macawber Engineering Limited, Doncaster, England

[21] Appl. No.: 441,517

[22] PCT Filed: Mar. 9, 1982

[86] PCT No.: PCT/GB82/00078
§ 371 Date: Nov. 5, 1982
§ 102(e) Date: Nov. 5, 1982

[87] PCT Pub. No.: WO82/03066
PCT Pub. Date: Sep. 16, 1982

[30] Foreign Application Priority Data

Mar. 9, 1981 [GB] United Kingdom ............... 8107284

[51] Int. Cl.³ ............................................. B65G 53/66
[52] U.S. Cl. ...................................... 406/11; 406/14; 406/50; 406/95
[58] Field of Search ...................... 406/14, 15, 19, 50, 406/93, 94, 95, 11

[56] References Cited

U.S. PATENT DOCUMENTS 3,929,379 12/1975 Krambrock ......................... 406/95

FOREIGN PATENT DOCUMENTS

| 2219199 | 10/1973 | Fed. Rep. of Germany | 406/95 |
| 2919696 | 2/1980 | Fed. Rep. of Germany | |
| 2085388 | 4/1982 | United Kingdom | 406/14 |
| 676513 | 8/1979 | U.S.S.R. | 406/19 |
| 698870 | 11/1979 | U.S.S.R. | 406/95 |

*Primary Examiner*—Jeffrey V. Nase
*Attorney, Agent, or Firm*—Brooks & Kushman

[57] ABSTRACT

A method of unblocking conveying pipes (3) for particulate material comprises feeding air to the pipe at spaced apart positions therealong in order to reduce the length of the blocking material. The air is injected into the pipe at positions which are preferably spaced apart by a distance less than the critical particulate material plug length to conveying pipe diameter ratio that will result in a pipe blockage that cannot be moved by application of pressure applied to one end of the particulate material plug. Apparatus for carrying out the method is also described.

4 Claims, 6 Drawing Figures

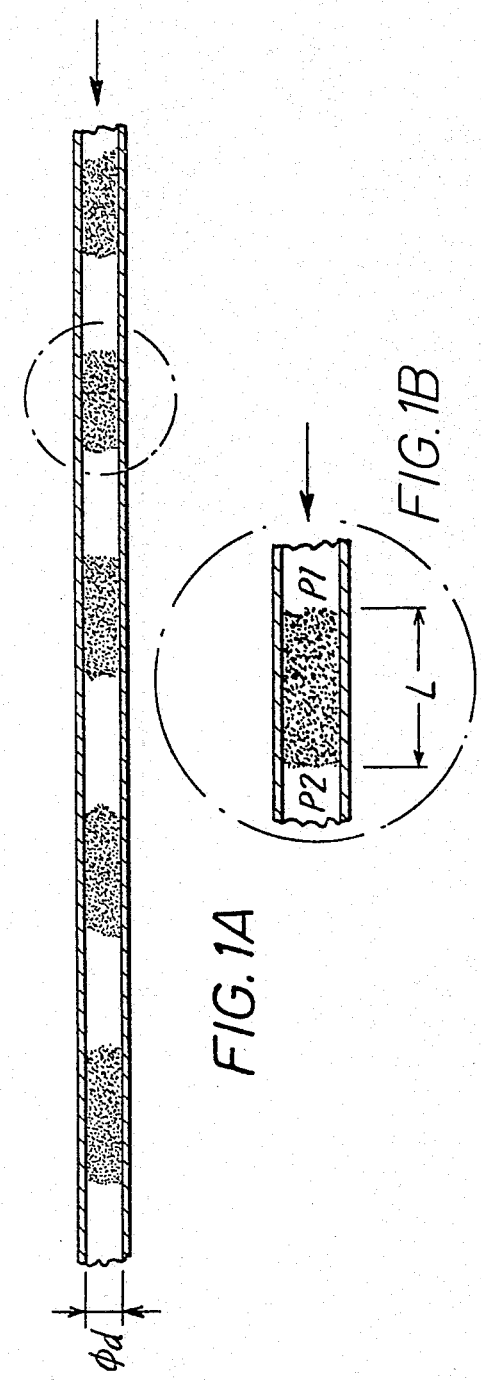
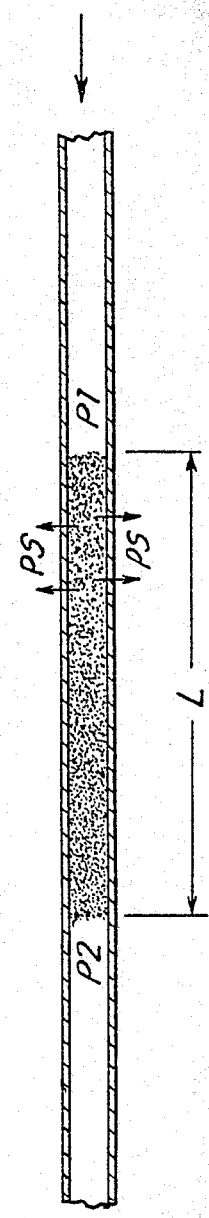
FIG. 1A
FIG. 1B
FIG. 2

METHOD AND APPARATUS FOR UNBLOCKING CONVEYING PIPES FOR PARTICULATE MATERIAL

The specification of this invention relates to conveying apparatus and in particular to apparatus for conveying particulate material.

BACKGROUND ART

Many materials handled in dense or medium phase conveying systems are prone to pipe blockages for a variety of reasons; some of which are:
(a) unstable material with varying partical size and/or moisture content;
(b) high friction relationship between material and pipe;
(c) failure of air supply or control system;
(d) plug length to diameter ratio incorrect;
(e) incorrect phase density or velocity in dilute or fluidised systems.

When a blockage occurs it takes considerable time to unblock the pipe which normally requires dismantling.

DISCLOSURE OF THE INVENTION

According to the present invention there is provided a method of unblocking conveying pipes for particulate material, comprising:

detecting pressure increases above a predetermined limit at a plurality of positions along the pipe;

feeding air into the pipe at positions which are spaced apart by a distance less than the critical particulate material plug length to conveying pipe diameter ratio that will result in a pipe blockage that cannot be moved by application of pressure applied at one end of the particulate material plug;

the air injection occurring in accordance with the pressure detected in the pipe, such that the particulate material blockage may be reduced into lengths such that the critical ratio is not reached and such that air is only injected into the pipe in the region of a blockage.

The method includes detecting a pressure increase above a predetermined limit at a position along the conveying pipe. A plurality of such pressure detecting means are located at appropriate positions along the pipe and operate the air injection means so as to enable the reduction of the length of particulate material blockage into lengths such that the critical ratio is not reached.

The present invention also provides apparatus for unblocking a conveying pipe for particulate material, comprising:

means for injecting air into the pipe, said air injection means being located at positions along the pipe which are spaced apart by a distance less than the critical particulate material plug length to conveying pipe diameter ratio that will result in a pipe blockage that cannot be moved by application of pressure on the end of the particulate material plug; and, a plurality of pressure sensing means for detecting a pressure increase in the pipe above a predetermined level located at spaced apart positions along the conveying pipe, each air injection means being coupled to at least one sensing means and operating in accordance with the pressure detected at the or each sensing means coupled thereto;

the arrangement being such that the air injection means operate to ensure the reduction of the length of the particulate material blockage into lengths such that the critical ratio is not reached and such that each air injection means is only operated when a particulate material blockage is located in the pipe in the region of the air injection means.

Preferably the sensing means are of a type that can detect the presence of a dense particulate material plug.

In another preferred embodiment of the present invention the sensing means are of a type that can detect movement or non-movement of the particulate material plug.

The apparatus and method of the present invention may relate to any conveying system for particulate material, for instance, a pneumatic conveying system or a hydraulic system. In the latter case the fluid for conveying an injection may be water.

The arrangement may be such that a single sensing means may be linked to more than one injection device.

The present invention also provides a conveying system, for instance, a pneumatic or hydraulic conveying system, for conveying particulate material along a conveying pipe, the system including apparatus of the invention for unblocking the conveying pipe.

Apparatus and a method in accordance with the present invention will now be described, by way of example only, and with reference to the accompanying drawings:

BRIEF DESCRIPTION OF DRAWINGS

FIG. 1A is schematic view of a typical dense or medium phase conveying system;

FIG. 1B is an enlarged view of a portion of the view of FIG. 1A;

FIG. 2 is a schematic view of a blocked pipe in the conveying system of FIG. 1;

BEST MODE FOR CARRYING OUT THE INVENTION

FIG. 1 shows the normal operation condition of a dense or medium phase conveying system under stable conditions. The diameter of the pipe is $\phi d$. The frictional resistance of the plug in the pipe is dependent on its length L and the difference between the pressures P1 and P2 on either side of the plug. The plug will move as long as the force on the end of the plug caused by the difference between P1 and P2 is greater than the frictional resistance of the plug.

FIG. 2 shows a pipe which is blocked. The plug length L is such that the frictional resistance due to natural pressure PS caused by material compaction is greater than the force on the end of the plug.

In apparatus in accordance with the present invention the position where the blockage has occurred is detected and air is injected along the length of the blockage, reducing the plug length and allowing normal conveying to be resumed.

Figure 3:
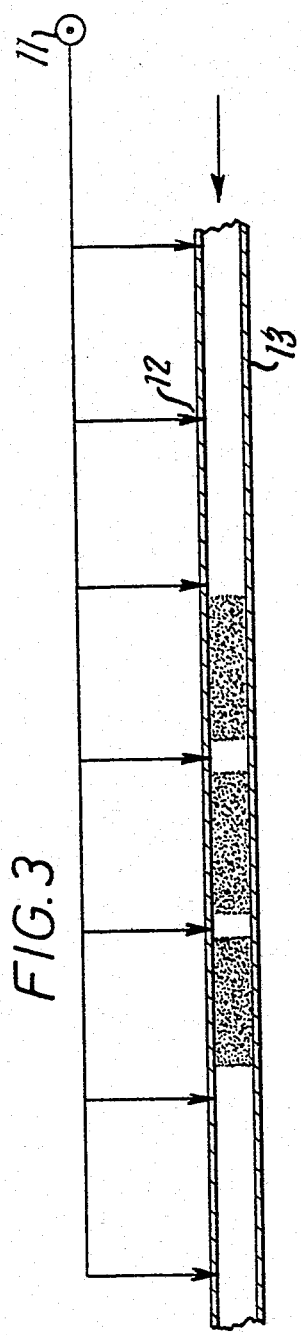
FIG. 3 is a schematic view of a prior art system unblocking the conveying pipe.

FIG. 3 illustrates an unsatisfactory method for reducing plug length. Air from supply 11 is injected continuously along the length of the conveying pipe 13 through injection points 12. This results in the aeration of the plug or the reduction of its plug length. However, this method requires high volumes of air to be employed and the plug velocity increases as each injection point is passed because of the increased air volume being added behind the plug or plugs.

Figure 4:
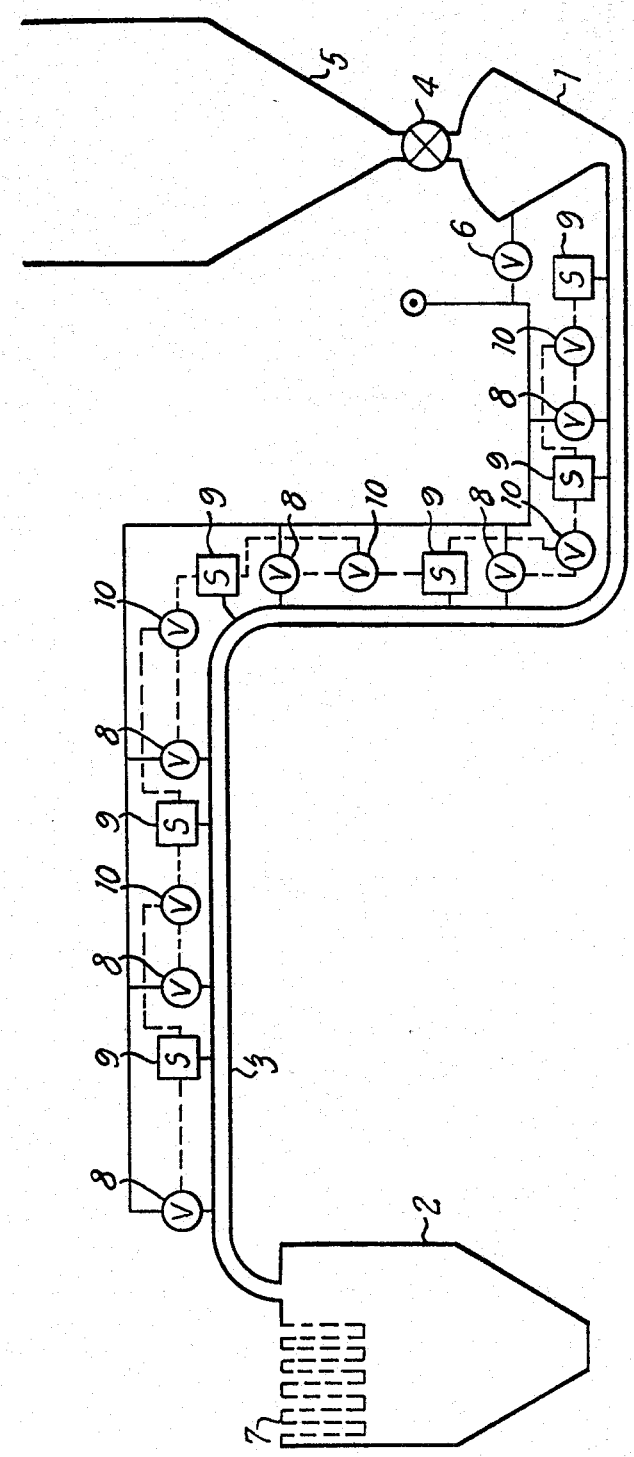
FIG. 4 is a schematic view of apparatus in accordance with the invention.

Apparatus in accordance with the present invention is illustrated in FIG. 4. A pneumatic conveying pressure vessel 1 is connected to a material receiving hopper 2 by a conveying pipe 3. A material feed hopper 5 is located above pressure vessel 1 and material may enter the latter from hopper 5 through inlet valve 4. Compressed air is applied to pressure vessel 1 via valve 6. Air can be allowed to escape from hopper 2 via filter 7.

A series of valves 8 are located at spaced-apart positions along the pipeline. Valves 8 may be supplied with air at a higher pressure than that supplied to vessel 1. Valves 8 are set to open when a predetermined pressure is detected by means of sensing points 9. A sensing point 9 also operates a valve 10 which cancels the signal to valve 8 on the upstream side (nearer vessel 1), thus ensuring that the only valve 8 that operates is the one immediately ahead of the last sensing point to operate.

Valves 8 will be set to operate only when the pressure at sensing point 9 is higher than the normal expected conveying pressure, the higher pressure indicating that a blockage has occurred.

Figure 5:
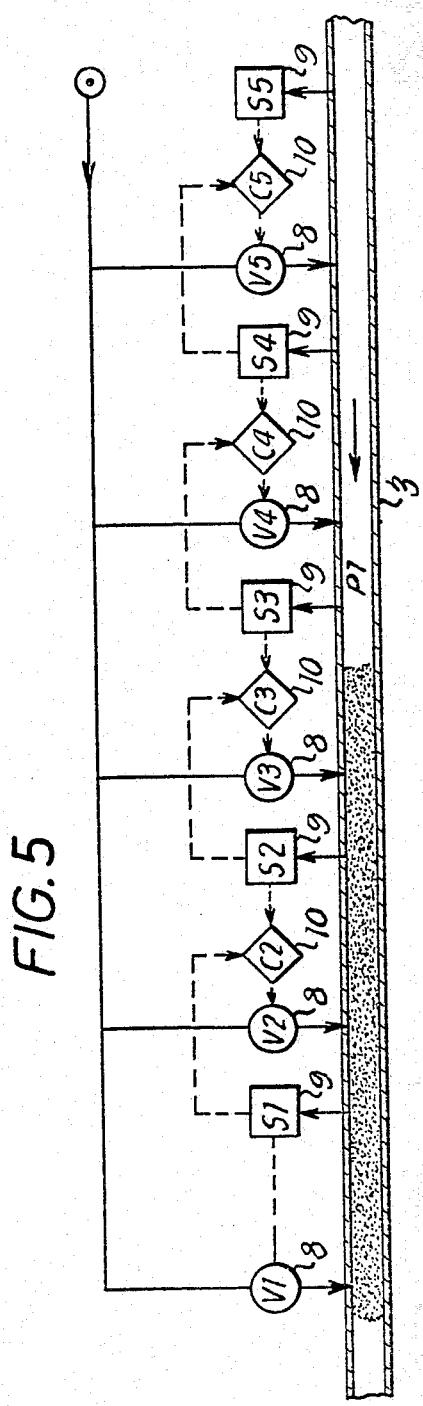
FIG. 5 is a schematic view of the operation of unblocking the pipe in the system of FIG. 4.

FIG. 5 illustrates a section of the conveying pipe when a blockage occurs. The distance between valves 8 is such that the length of plug between valves 8 is less than for the critical d/L, ratio required to block the pipe. Sensing points S3, S4 and S5 will sense a pressure build up P1 when the blockage occurs, these sensing points will operate simultaneously.

S5 will try to open V5 but S4 will cancel this signal via C5. S4 will try to open V4 but S3 will cancel this signal via C4. S3 will open V3 injecting air into the blockage. If the blockage is not reduced in length sufficiently to move, the pressure build-up near V3 will operate S2 cancelling out V3 via C3 and operating V2 and so on until the blockage has been reduced into several discrete plugs of reduced length that will move. When conveying has resumed the pressure P1 will reduce and fall below the point at which the sensing points will operate. In practice, the operation of the sensing points and clearing of the pipe takes only a few seconds.

The pressure sensing means and air injection means can be of many different types, for example, electrical pressure transducers or pneumatic pressure switches for sensing, and air or electrically operated air valves.

Although the sensing points have been shown between the valves 8 being operated and the valves 8 being cancelled, it is possible to move the sensing point to a position upstream of the valves 8 being cancelled. An alternative arrangement is to provide only one sensing point for every 2 or 3 air injection points so that a group of valves will work simultaneously, the sensing point could be within the group or outside the group in relationship along the length of the pipe.

The unblocking apparatus in accordance with the present invention may be used as an integral part of the conveying system. Thus particulate material can be loaded into the conveying pipe in such a manner to ensure that it blocks in the conveying pipe. The unblocking apparatus will then convey the material along the conveying pipe in a relatively slow and orderly fashion until the end of the pipe is reached. It is particularly desirable for materials that are fragile or for which minimum degradation is required.

I claim:

1. Apparatus for unblocking conveying pipes for particulate material comprising:
    means for injecting air into the pipe, said air injection means being located at positions along the pipe which are spaced apart by a distance less than the critical particulate material plug length to conveying pipe diameter ratio that will result in a pipe blockage that cannot be moved by application of pressure on the end of the particulate material plug; and
    a plurality of pressure sensing means for detecting a pressure increase in the pipe above a predetermined level located at spaced apart positions along the conveying pipe, each air injection means being coupled to a first pressure sensing means, at a position upstream of the air injection means, and to a second pressure sensing means at a position downstream of the air injection means, the air injection means operating when the pressure detected by the first pressure sensing means is above the predetermined level, but not operating when the pressure detected at both the first and the second pressure sensing means is above said predetermined level;
    the arrangements being such that the air injection means operate to ensure the reduction of the length of the particulate material blockage into lengths such that the critical ratio is not reached and such that, each air injection means is only operated when a particulate material blockage is located in the pipe in the region of the air injection means.

2. Apparatus in accordance with claim 1, wherein the air injection means is capable of feeding air into the pipe at a pressure higher than the pressure of the air conveying the material within the pipe.

3. A method of unblocking conveying pipes for particulate material, comprising:
    detecting pressure increases above a predetermined limit at a plurality of positions along the pipe;
    feeding air into the pipe at positions which are spaced apart by a distance less than the critical particulate material plug length to conveying pipe diameter ratio that will result in a pipe blockage that cannot be moved by application of pressure applied at one end of the particulate material plug,
    the air injection occurring at a position along the pipe when the pressure detected upstream of said position is above a predetermined level, and air injection not occurring at said position when pressure detected upstream and downstream of said position is above said predetermined level, such that the particulate material blockage may be reduced into lengths such that the critical ratio is not reached and such that air is only injected into the pipe in the region of the blockage.

4. A conveying system for conveying particulate material along a conveying pipe which includes apparatus for unblocking the conveying pipe comprising:
    means for injecting air into the pipe, said air injection means being located at positions along the pipe which are spaced apart by a distance less than the critical particulate material plug length to conveying pipe diameter ratio that will result in a pipe blockage that cannot be moved by application of pressure on the end of the particulate material plug; and
    a plurality of pressure sensing means for detecting a pressure increase in the pipe above a predetermined level located at spaced apart positions along the the conveying pipe, each air injection means being coupled to a first pressure sensing means, at a position upstream of the air injection means, and to a second pressure sensing means at a position downstream of the air injection means, the air injection means operating when the pressure detected by the first pressure sensing means is above the predetermined level, but not operating when the pressure detected at both the first and the second pressure sensing means is above said predetermined level;

the arrangement being such that the air injection means operate to ensure the reduction of the length of the particulate material blockage into lengths such that the critical ratio is not reached and such that, each air injection means is only operated when a particulate material blockage is located in the pipe in the region of the air injection means.

* * * * *